United States Patent [19]

Tani et al.

[11] 4,334,886
[45] Jun. 15, 1982

[54] METHOD OF MANUFACTURING TABLE SALT

[76] Inventors: Katsuhiko Tani; Tamio Sakamoto, both of Aza-Mabuse, Nomasu, Oshima-cho, Tokyo, 100-01, Japan

[21] Appl. No.: 187,839

[22] PCT Filed: Feb. 23, 1979

[86] PCT No.: PCT/JP79/00044

§ 371 Date: Oct. 24, 1979

§ 102(e) Date: Oct. 24, 1979

[87] PCT Pub. No.: WO79/00713

PCT Pub. Date: Oct. 4, 1979

[30] Foreign Application Priority Data

Feb. 24, 1978 [JP] Japan ................................. 53-20563

[51] Int. Cl.³ ............................................. C01D 3/06
[52] U.S. Cl. ........................................ 23/303; 23/300; 159/1 S; 159/16 R; 159/DIG. 28; 203/10; 426/649
[58] Field of Search ............... 426/649; 23/300, 303, 23/296, 302 R; 422/902; 159/1 S, 16 R, 13 R, 13 C, DIG. 28; 203/10

[56] References Cited

U.S. PATENT DOCUMENTS

| | | | |
|---|---|---|---|
| 681,407 | 8/1901 | Coward | 23/303 |
| 1,684,935 | 9/1928 | Zalocostas | 23/303 |
| 2,876,182 | 3/1959 | Hopper et al. | 23/303 |
| 3,647,396 | 3/1972 | DeWittie et al. | 23/303 |
| 3,779,030 | 12/1973 | Best | 23/303 |
| 3,918,916 | 11/1975 | Garrett | 23/303 |
| 4,026,676 | 5/1977 | Fiedelman | 23/303 |

FOREIGN PATENT DOCUMENTS

| | | | |
|---|---|---|---|
| 199607 | 6/1923 | United Kingdom | 23/300 |
| 626641 | 7/1949 | United Kingdom | 23/300 |

*Primary Examiner*—Gregory N. Clements
*Attorney, Agent, or Firm*—Oblon, Fisher, Spivak, McClelland & Maier

[57] ABSTRACT

A method of manufacturing table salt effectively containing an efficient amount of the minerals from the sea water by using not fuel or electric energy but natural energy only. The method comprising the steps of infiltrating and flowing down the sea water from a hollow tower made of liquid permeable materials and producing primary salt water adding raw salt thereto to cause low solubility components to be separated and precipitated leaving residual salt water, and evaporating the moisture from said residual salt water at ambient temperature and humidity to produce table salt.

3 Claims, 4 Drawing Figures

METHOD OF MANUFACTURING TABLE SALT

FIELD OF THE INVENTION

This invention concerns a method of manufacturing table salt containing a sufficient amount of minerals from the sea water using natural energy.

DESCRIPTION OF THE PRIOR ART

A typical method of manufacturing table salt as conventionally handled up to now is the ion-exchange membrane method. By this ion-exchange membrane method, sodium ions (positive ions) and chlorine ions (negative ions) of sea water are collected between ion-exchange membranes by means of electrophoresis and ion dialysis to produce concentrated salt water, which is then evaporated in a vacuum evaporating can and thus concentrated into table salt. This method is the so-called electrochemical method which separates pure NaCl from sea water. Therefore, 99.5% of the salt is composed of NaCl. Less than 0.5% consists of minerals such as Mg and Ca, which salt contains in large quantity when produced by the ancient solar method.

Those minerals are essential and indispensable to maintain human life. However, as we have just pointed out, the highly purified table salt contains almost no such minerals, and considerable concern and worry have arisen that long-term use of such purified table salt may destroy the balance of minerals in the human body and thus cause health problems. The basis of this concern is that the blood, body fluids or amniotic water in the human body contain such elements as Na, Mg, K, Ca or Cl at almost the same rate as sea water, and that it has been medically proven, for example, by Ringer's solution that those mineral elements and their content rates are very closely related with the maintenance and survival of life.

Two other problems of modern life are caused in part by the conventional method for manufacturing table salt. Firstly, concentrated sulfuric acid is used to increase conductivity conductance in the ion-exchange membrane method and hydrochloric acid is also used to wash the ion-exchange membranes. Sea pollution which has been caused by the waste fluid from the use of such strong acids has become a serious problem. Secondly, the above mentioned minerals are of great help in providing a certain mellow character to the taste of salt and in bringing out the taste in other foods. However, the salt manufactured by the conventional method contains so little of the above mentioned minerals that it has only a very sharp salty flavor and can neither accentuate nor bring out the naturally delicious taste in food. Consequently, the taste of salty pickles, bean paste, pickled plums, and other kinds of food has deteriorated. This weak point of the conventionally accepted method of manufacturing salt has been pointed out by a wide assortment of experts.

For these reasons, table salt containing a sufficient amount of minerals is called for. However, conventional methods of manufacturing table salt with supposedly a sufficient amount of minerals prove unhelpful, regardless of whether they lift salt water up to a salt pool, enclose sea water at high tide into an embanked place, or let sea water flow down. Such methods require a vast area for collecting salt, and in a country like Japan where the humidity is high and the rain considerable, this process of collecting salt turns out to have a very low rate of efficiency. Also, excessive labor is needed as well as an extremely high fuel expense for the process of boiling the sea water to gain salt. Accordingly, the production cost would be very high. What is even worse is that since the scale-forming components such as $Fe_2O_3$, $CaCO_3$, $CaSO_4$, $CaCl_2$, etc., are eliminated for the safety and maintenance of manufacturing systems during initial stages in the process of boiling the sea water, the salt produced by this method still does not contain enough minerals.

In light of such complications, research has been undertaken for a long time to discover a satisfactory method for the manufacture of salt which would contain a sufficient amount of the natural minerals normally found in sea water. This study has developed a method for manufacturing salt containing a sufficient amount of minerals such as Ca, Mg, or K, which is done at a lower than normal cost due to its reliance on natural energy alone (for example, wind power or solar power).

DISCLOSURE OF THE INVENTION

In sum, the salt manufacturing method in this invention contains the following steps. First, concentrate the sea water to gain primary water, to which raw salt is added in the salt water tank so that the primary salt water will become supersaturated, thus causing the low solubility components in the salt water to separate and precipitate. The residual salt water is concentrated even more in order to acquire the secondary salt water, the moisture of which will be evaporated at the normal temperature and humidity to produce table salt. The manufacturing system provides sea water by a sprinkling system to a hollow tower which is built with many ventilation openings and which is made of liquid permeable materials. Thus, the sea water will be able to infiltrate and flow down from the upper part to the bottom part of the said tower, and accordingly the primary salt water of 5°-8° Baumé, hereafter called, Bé will be produced in the evaporation pool which is installed at the bottom of said tower. The primary salt water will become supersaturated after adding the raw salt to the salt water tank, thereby causing the separation and precipitation of the low solubility components in the salt water. Then, the residual salt water will be recycled for one or more times to the sprinkler of the tower, to be able to infiltrate and flow down from the upper part to the bottom part of the tower, to produce a further concentrated secondary salt water of 10°-15° Bé, the moisture of which will naturally evaporate at a normal temperature and normal humidity to produce table salt.

DETAILED DESCRIPTION OF THE INVENTION AND PREFERRED EMBODIMENTS

In the following pages is found a concrete and detailed explanation of this invention.

Figure 1:
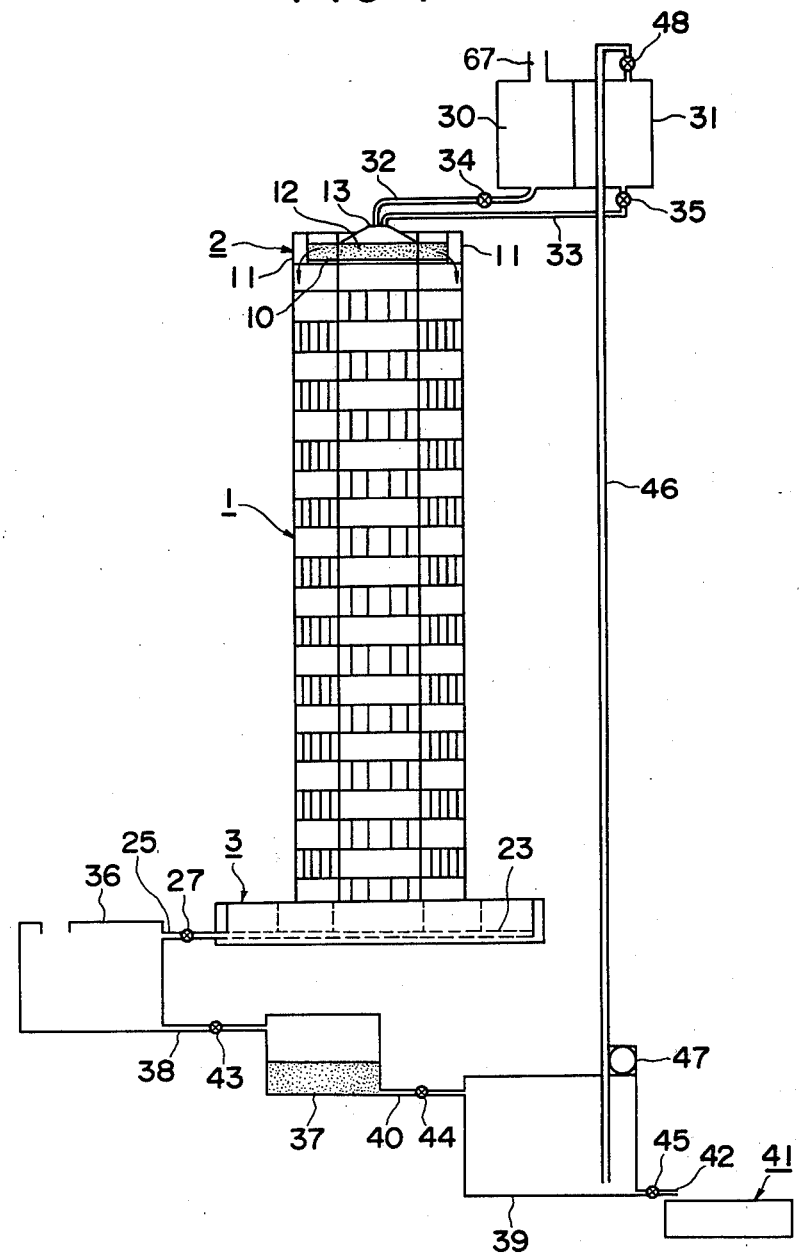
FIG. 1 shows the explanatory schematic view of the system for table salt manufacturing under this invention.

FIG. 1 shows the system used for this new method of manufacturing table salt.

Figure 3:
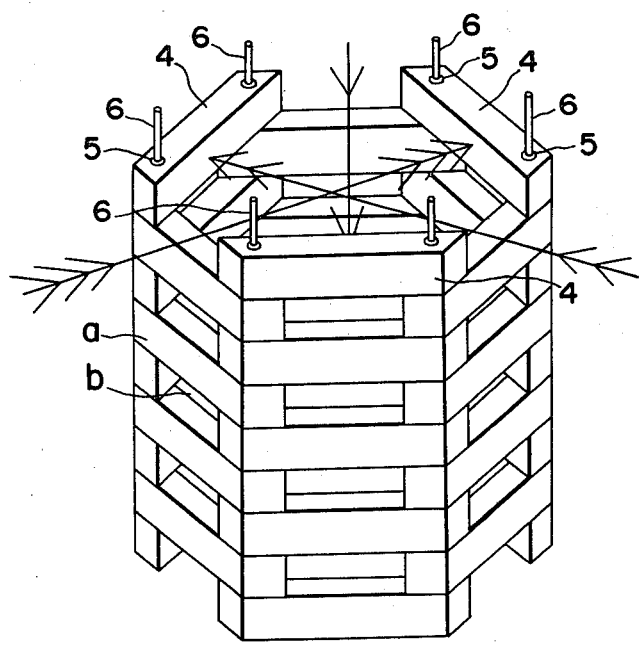
FIG. 3 is a detail showing the structure of the tower.

In this drawing, 1 is the hollow tower, 2 is the sprinkling system installed at the top of the tower 1, and 3 is the evaporation pool which is installed at the bottom of the tower 1. As is shown in FIG. 3, the tower 2 is built of liquid permeable materials such as pumice and sandstone. Each of its composing units 4, 4, and 4, which individually are shaped into an almost rectangular form, are for every stage of the tower positioned at every other side of the regular hexagon, thus leaving an empty side at each side of a composing unit 4. Each stage of the tower, therefore, should have a total of only three composing units 4, 4, and 4 put at every other stage of a single side of the hexagon; Thus, both ends of each composing unit 4 should be placed on the end of the two composing units 4 and 4 immediately below it and the composing units should be fixed to each other, forming a hollow hexagonal pillar. Consequently, on each of the six sides of the hexagonal pillar a wall (a) and an opening, that is a ventilation (b), are formed at every two stages, and on the adjacent sides of the hexagon a wall (a) and a ventilation (b) are arranged in reverse order. At the end of both sides of each composing unit 4 vertical holes 5 and 5 are made. When the composing units 4 are piled on top of one another, the through holes 5 on either end of a composing unit 4 should meet with the through holes 5 of other composing units immediately above or below it so that core material 6, such as an iron reinforcing rod, may be inserted in the through holes 5. The composing units 4 are tightly fixed to one another by the core material fixed to the through holes 5 with mortar. Also, in the midst of the ventilation (b) which is formed between two composing units 4 and 4, a pillar 7 of the same material as that of a composing unit 4 is inserted and built in between two composing units 4 and 4 immediately above and below. There are vertical through holes 8 and 9 made in the midst of each composing unit 4 and in the pillar 7. The composing units and the pillars should be so placed that the through holes 8 and 9 meet with each other and the core material such as an iron reinforcing rod is inserted and buried in the through hole.

Figure 2:
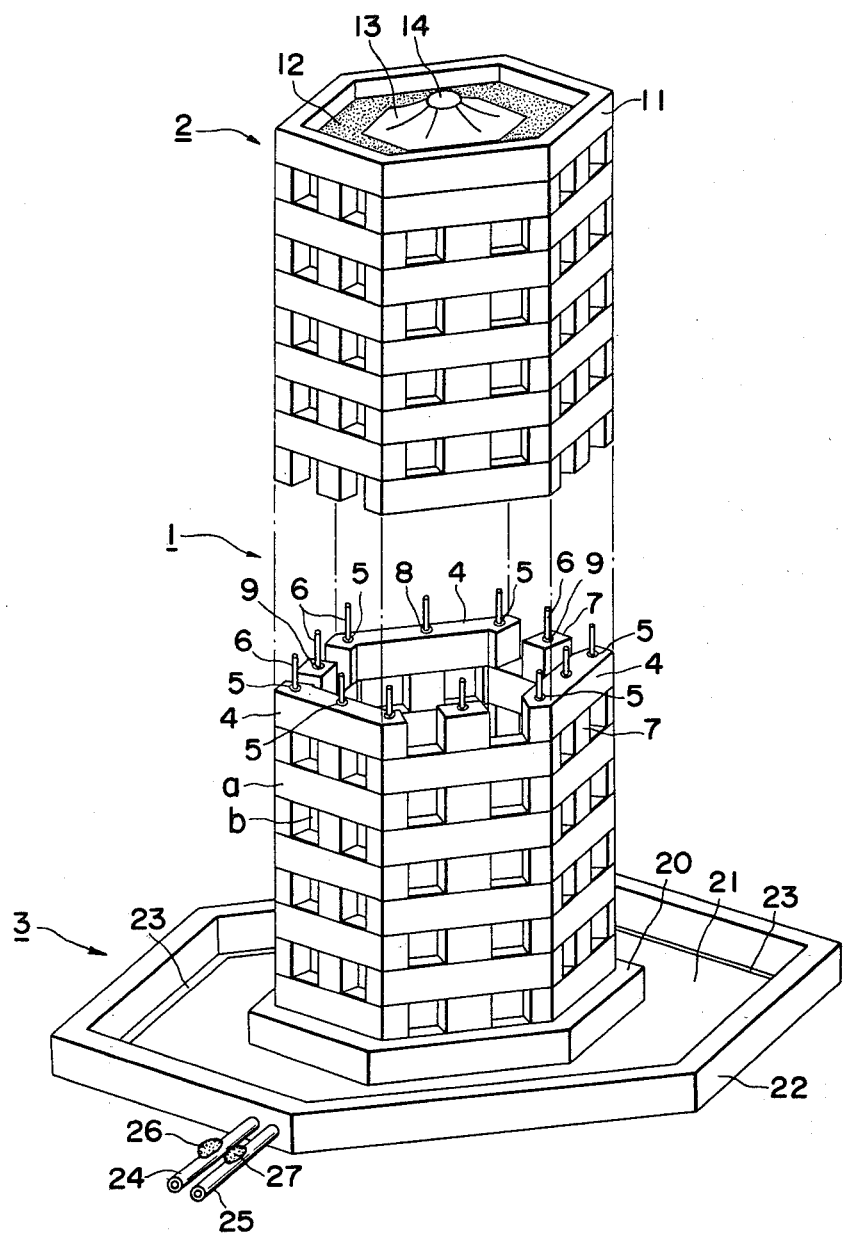
FIG. 2 is an angular view of the sprinkling system, tower and evaporation pool.

As is shown in FIGS. 1 and 2, the sprinkling system is of a container or vessel shape which has a bottom part 10 made of a hexagonal water-proof slate or wooden plate, in addition to having a frame wall 11 surrounding the hexagonal bottom 10. The frame wall 11 is of a hexagonal shape which is almost as large as the hexagonal of the tower 1, to which it is fixed. Also like the tower 1, the frame wall 11 is built of liquid-permeable material. On the bottom plate 10 is installed a liquid filtration layer 12 which consists of sand, etc., and on the upper surface, at almost the center of the liquid filtration layer 12, is placed a sprinkler 13 which is of almost hexagonal pyramid shape. At the summit of the hexagonal pyramid, which is the center of the sprinkler 13, is formed a concave hemisphere 14.

As is shown in FIGS. 1 and 2, the evaporation pool is vessel-shaped and consists of both a hexagonal bottom 21 surrounding the hexagonal base 20 of the tower 1 and a hexagonal frame wall 22 surrounding the bottom 21. An effluent ditch 23, made in a hexagonal form, is located along the edge of the bottom 21 and just inside the frame wall 22. The bottom 21 is built with a very slight incline toward the effluent ditch 23. The frame wall 22 is provided with two pipe lines, one a discharge pipe 24 and the other a transportation pipe 25. The effluent ditch 23 is placed at a slight incline down toward the discharge pipe 24 and the transportation pipe 25. 26 and 27 are cocks.

30 is a sea water tank, 31 is a salt water tank, and 32 and 33 are water feed pipes which are installed in, respectively, the sea water tank 30 and the salt water tank 31 and which pour sea water or salt water to the summit of the sprinkler 13 of the sprinkling system 2. 34 and 35 are cocks and 67 is a sea water feeding inlet.

36 is the primary salt water tank into which salt water flows through a transportation pipe 25 from the evaporation pool 3. 37 is a filter tank into which the salt water from the primary salt tank 36 flows through the transportation pipe 38, and 39 is the secondary salt water tank into which the salt water in the filter tank 37 is sent through the transportation pipe 40. 41 is an evaporation system into which the salt water in the secondary salt water tank 39 is sent through a discharge pipe 42. 43 44, and 45 are cocks which are installed in respectively the transportation pipes 38, and 40 and the discharge pipe 42. 46 is a transportation pipes through which the salt water in the secondary salt water tank 39 is sent to the salt water tank 31 by a pump 47. 48 is a cock.

Also, the tower 1 does not have to be of a hexagonal shape; a square shape or other shape is acceptable. A double-walled tower, that is, a hollow tower with a smaller hollow tower inside is also acceptable.

Figure 4:
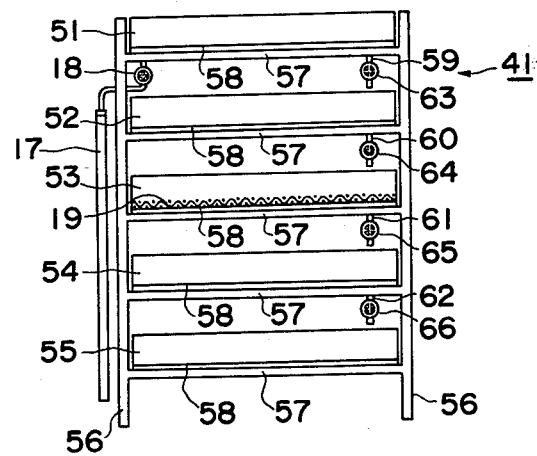
FIG. 4 shows the explanatory schematic view of the evaporation system.

FIG. 4 shows the structure of the evaporation system 41, where no less than two evaporation dishes—in this model we use five 51, 52, 53, 54 and 55—are placed like stages at a proper vertical distance from one another, on the cleats 57 which are installed on four legs 56. These dishes are made in a rectangular box shape of a prescribed depth and with their tops open. The bottom 58 of each evaporation dish 51-55 consists of heat-insulated material and is provided with a water feed pipes 59, 60, 61 or 62 to transfer the liquid to the evaporation dish one stage below. 63, 64, 65, and 66 are cocks of the water feed pipes 59, 60, 61 and 62, respectively. Also, on the top evaporation dish 51 is installed a discharge pipe 17 to conduct the liquid out of the system. 18 is a cock. On the upper surface of the bottom 8 of the evaporation dish 53 is placed an adhesive material 19 which consists of cloth such as linen.

Now, let us explain the salt manufacturing method that depends on the use of this system.

First, the sea water in the sea water tank 30 is provided to the sprinkler 13 in the sprinkling system 2 through the water feed pipe 32, with the amount of the sea water provided being controlled by the cock 34. The sea water begins to flow out and be distributed evenly by the sprinkler 13. The dust and other impurities in the sea water are removed while the sea water is passing through the liquid filtration layer 12. In case the sea water flows unevenly and in an unbalanced way along the sprinkler, the angle of the sprinkler 13 above the filtration layer 12 of sand should be changed and controlled so that the water flow becomes even. After going through the filtration layer 12, the sea water infiltrates into the frame wall 11 consisting of liquid permeable material and flows down, as is shown in FIG. 1, from the top of the tower 1. Some liquid filters through the wall of the tower 1 consisting of liquid permeable material, and some goes down along the outside of the wall, then gradually to the bottom end of the tower 1. While the sea water flows down from the top to the bottom of the tower 1, the temperature of each composing unit which has been warmed by the sun infiltrates into the sea water to accelerate the evaporation of moisture in the sea water. Also, as is shown in FIG. 3, the wind which blows in from the ventilation opening (b) at a right angle does not pass through the tower 1 as is in the cases of aforementioned conventional manufacturing method. Instead, it hits the facing wall (a) to improve the ventilation both inside and outside of the tower 1. Thus, the evaporation of the sea water flowing down along both the inside and outside surfaces of the wall (b) is extremely accelerated to raise the concentration of the sea water. The sea water concentrated in this way flows out from the bottom end of the tower 1 and gathers in the evaporation pool 3. Since the evaporation pool 3 is provided with a sufficiently large bottom area 21, the sea water spreading onto this bottom area 21 will be concentrated even more with its moisture evaporated by the solar heat and the wind.

In this way, the primary salt water of concentration of about 5°–8° Bé is made in the evaporation pool 3, the degree of concentration depending on the amount of water flowing from the sea water tank 30, the temperature, humidity, or the weather. When the cock 27 is opened, the primary salt water in the evaporation pool 3 is sent to the primary salt water tank 36 by way of the transportation pipe 25. When a proper amount of raw salt is projected in the primary salt water gathering in the primary salt water tank 36, such low solubility components in the primary salt water as $Fe_2O_3$ (in actuality, $Fe(OH)CO_3$) or $CaCO_3$ will become saturated and so extracted and precipitated as crystals. Next, the cock 43 is opened, and the primary salt water in the primary salt water tank 36 is led by way of the transportation pipe 38 to the filter tank 37, where precipitated $Fe_2O_3$ and $CaCO_3$ are filtrated. The residual salt water is transferred to the secondary salt water tank 39 by releasing the cock 44.

Then, the residual salt water gathering in the secondary salt water tank 39 is sent by a pump 47 to the salt water tank 31 by way of the transportation pipe 46. Next, the residual salt water is supplied through the water feed pipe 43 to the sprinkling system 2, with the amount of the flowing salt water being controlled by the cock 35. As the residual salt water permeates and flows down through the tower 1, it will become more concentrated. During this process, excessive soft-scale-forming components such as $Fe_2O_3$ or $CaCO_3$ have already been removed in the filter tank 37, and so, such soft-scale-forming components are prevented from becoming attached to or clogging up its passage in the tower 1. And yet, the amount of such components needed for table salt is still kept in the residual salt water. The residual salt water which is concentrated while flowing down through the tower 1 passes through the evaporation pool 3, the primary salt water tank 36, and the filter tank 37, and gathers in the secondary salt water tank 39. After circulating through the tower 1 once or twice like this, the residual salt water becomes concentrated and the secondary salt water of about 10°–15° Bé concentration is accumulated in the secondary salt water tank 39. In this case, if the concentration rate goes over 15° Bé, hard-scale-forming component $CaSO_4$ will precipitate, become attached to the tower 1 or other parts of the system and thus cause a clogging problem. Therefore, attention should be paid to keeping the concentration of the secondary salt water at no more than 15° Bé.

Then, the cock 45 is released to transfer to the evaporation system 41 the secondary salt water in the secondary salt water tank 39 which has been concentrated to 10°–15° Bé. In other words, as the secondary salt water is sent to the evaporation dish 51 of the top stage of the system, the cock 63 is operated so that the secondary salt water in the evaporation dish 51 is received in the evaporation dish 52, where its moisture is evaporated naturally. Then, the cock 64 is operated to transfer the salt water to the evaporation dish 53. In this evaporation dish 53, the salt water is naturally more concentrated to the concentration of about 20° Bé. In the evaporation dish 53, hard-scale-forming components such as $CaSO_4$ precipitate, and which the salt water in the evaporation dish 53 is transferred to the evaporation dish 54 by operating the cock 65, the precipitated hard-scale-forming components will be attached to the adhesive material and removed. When the salt water is concentrated in the same way in the evaporation dish 54 to the concentration of about 25° Bé, desired salt crystals will precipitate. Once more, the salt water remaining in the evaporation dish 54 is transferred to the evaporation dish 65 by operating the cock 66. The moisture is then completely evaporated to the concentration of over 25° Bé. In this way, crystal salt will be produced in the evaporation dishes 54 and 55.

EXAMPLE I

The following paragraphs contain an actual example of this process in operation.

For the tower 1, as shown in FIG. 2, we used a hexagonal cylinder of 6 m high, which consisted of lightweight concrete blocks piled up and inserted with iron reinforcing rods, which were connected with mortar. Sea water of 1440 liters was supplied from the sea water tank 30 to the sprinkling system 2 for 24 hours at the speed of 1 liter per minute. It took about thirty minutes for the sea water to permeate and flow down to the bottom of the tower 1, and then the sea water was left in the evaporation pool 3 to be concentrated. The average temperature was 10° C., and the humidity was 63%. The concentration of the salt water in the evaporation pool 3 was 6° Bé. This primary salt water was thus accumulated in the primary salt water tank 36, and 20 g of raw salt was added. Then, the salt water was filtered through the filter layer 37. The concentration of the residual salt water which flowed into the secondary salt water tank 39 was almost the same as that of the primary salt water. The residual salt water was once more drawn up to the salt water tank 31 and was concentrated while passing down through the tower 1. Then, the secondary salt water of 10° Bé was received in the secondary salt water tank 39. After one more circulation in the tower 1, the concentration of the secondary salt water received in the secondary salt water tank 39 became 14° Bé. This secondary salt water was led to the evaporation system 41 where its moisture was evaporated. Then, about 4 Kg of table salt was produced in the crystallizing dishes 54 and 55. The results of an analysis of the components of this table salt are shown in Table No. 1 and Table No. 2. Table No. 1 shows the composition ratio of the single elements in the samples, and Table No. 2 shows the compositional ratio of the elements as compounds on the basis of the results of Table No. 1. In Table No. 2, the percentage of NaCl, $MgCl_2$, $MgSO_4$, $CaSO_4$ and KCl are respectively calculated in terms of the percentage of Na, Mg, So, Ca, and K in the Table No. 1. Also, for your reference, the results of a compositional analysis of some marketed table salt which are labelled "Table Salt" are shown as well.

TABLE No. 1

| Result of Compositional Analysis (Single Elements) | | |
|---|---|---|
| | This invention's table salt | Presently marketed "Table Salt" |
| —SO$_4$ | 1.6% | 0.18% |
| K | 174 mg % | 65.1 mg % |
| Mg | 479 mg % | 16.9 mg % |
| Ca | 324 mg % | 95.6 mg % |
| Na | 31.4% | 37.9% |
| Cl | 52.3% | 59.8% |

TABLE No. 2

| Result of Composition Analysis (Compounds) | | |
|---|---|---|
| | This invention's table salt | Presently marketed "Table Salt" |
| NaCl | 80.10% | 96.38% |
| MgCl | 1.140% | 0% |
| MgSO$_4$ | 0.954% | 0.30% |
| CaSO$_4$ | 1.102% | 0.221% |
| KCl | 0.332% | 0.124% |
| Moisture etc. | 16.37% | 2.98% |

Also, the salt crystals produced in this new method are 3–10 times as large as those produced in the ion-exchange membrane method.

Also, the taste of the table salt produced by this new method was tested and compared by 50 panelists to the tastes of three kinds of widely marketed table salt—"Table Salt," "Ama-Salt," and "Refined Salt." The results of the panelists' ranking are shown in Table No. 3. ("Ama-Salt" is the kind of salt made by comining some imported Chinese brine and dissolving this mixture in water before heating and re-crystallizing it.)

TABLE 3

| Result of Taste Test | | | | |
|---|---|---|---|---|
| | This invention's table salt | Marketed "Ama-Salt" | Marketed "Table Salt" | Marketed "Refined Salt" |
| The number of panelists who accorded this salt 1st place | 35 | 11 | 4 | 1 |
| The number of panelists who accorded this salt 2nd place | 14 | 23 | 2 | 10 |
| The number of panelists who accorded this salt 3rd place | 1 | 13 | 24 | 12 |
| The number of panelists who accorded this salt 4th place | 0 | 3 | 20 | 27 |
| Total rankings | 66 | 108 | 160 | 165 |
| Ranking | 1 | 2 | 3 | 4 |

As the results of the analysis and the taste examination clearly show, the table salt produced according to this newly invented method contains many more minerals than the conventionally produced table salts tested. In addition, its taste is remarkably better.

Under this invention, the moisture in the salt water evaporates very slowly and precipitation starts with the residual low solubility components (except for NaCl, the main component of salt water). Then, these components plus NaCl begin to form their crystals almost simultaneously. This process enables the salt to retain a large amount of MgCl$_2$, CaSo$_4$, and KCl with different solubility. And so, table salt containing many minerals will be available for use. Also, this salt gives a mellow taste to the tongue since other components than NaCl are contained in sufficient amount not only inside but also outside of the crystals. This salt then is unlike the conventional types of table salt which contain a highly purified NaCl and give a very bitter stimulation. This chemical fact explains the aforementioned results of the panelists' comparison of the taste of different kinds of table salt. Also, since only natural energy such as the wind and solar heat is used (except for the operation of raising the sea water and the salt water to the top of the tower), no fuel and only little human labor are required. Also, no chemical treatment agents or pollution-causing materials are used at all, and no large building site is needed. Since concentration of the salt water is carried out in the vertically built tower, the impact of rainfall on the operation and production of this method is negligible. Also, since evaporation is mainly accelerated by wind power, the rate of efficiency does not drop during the night, and if the tower is built near the coast, the efficiency of concentration will improve considerably. All of these improvements result in higher manufacturing efficiency and a lower cost of salt production. Also, since the soft scales fall off in the filter tank and the concentration of the salt water is kept at no higher than 10°–15° Bé in order to prevent the precipitation of the hard scales, the production system is protected from clogging and injury. In case more than one model of this system is installed on the same building site, the use of the hexagonal shape for the tower and the evaporation pool enables the installation of the maximum number of towers per unit area, and thus achieves the best evaporation efficiency and land usage rate.

What is claimed is:

1. A method of manufacturing table salt comprising a sprinkling system providing sea water to a hollow tower built with many ventilation openings and made of liquid permeable materials, allowing said sea water to infiltrate and flow down from the upper part to the bottom part of the said tower, and producing primary salt water of about 5°–8° Bé having low solubility components in an evaporation pool installed at the bottom part of the said tower, adding sufficient raw table salt to said primary salt water to supersaturate said primary salt water and cause said low solubility components in said primary salt water to separate and precipitate leaving residual salt water, repeating said infiltration from the top to the bottom of the tower until said residual salt water reaches 10°–15° Bé, and evaporating the moisture from said secondary salt water at ambient temperature and humidity to produce table salt.

2. The method of claim 1 wherein prior to the last evaporating step the salt water is concentrated to about 20° Bé to precipitate CaSO$_4$ which is removed by filtration.

3. The method of claim 2 wherein the salt water remaining after removal of CaSO$_4$ is concentrated to about 25° Bé to produce said table salt.

* * * * *